United States Patent
Shimizu et al.

(10) Patent No.: US 11,270,589 B2
(45) Date of Patent: Mar. 8, 2022

(54) SURROUNDING VEHICLE DISPLAY METHOD AND SURROUNDING VEHICLE DISPLAY DEVICE

(71) Applicant: Nissan Motor Co., Ltd., Kanagawa (JP)

(72) Inventors: Youji Shimizu, Kanagawa (JP); Tetsuya Yamamoto, Kanagawa (JP); Seiko Kawai, Kanagawa (JP); Katsumi Kimura, Kanagawa (JP); Ryusuke Ueki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/641,834

(22) PCT Filed: Aug. 25, 2017

(86) PCT No.: PCT/JP2017/030481
§ 371 (c)(1),
(2) Date: Feb. 25, 2020

(87) PCT Pub. No.: WO2019/038903
PCT Pub. Date: Feb. 28, 2019

(65) Prior Publication Data
US 2020/0219398 A1 Jul. 9, 2020

(51) Int. Cl.
*G08G 1/16* (2006.01)
*B60R 1/00* (2006.01)
(Continued)

(52) U.S. Cl.
CPC .............. *G08G 1/167* (2013.01); *B60R 1/00* (2013.01); *B60W 30/18163* (2013.01);
(Continued)

(58) Field of Classification Search
None
See application file for complete search history.

(56) References Cited

U.S. PATENT DOCUMENTS

| 6,269,304 B1 | 7/2001 | Kaji et al. |
| 2009/0143967 A1* | 6/2009 | Lee .......................... B60R 1/00 701/119 |

(Continued)

FOREIGN PATENT DOCUMENTS

| JP | 2003312415 A | * 11/2003 |
| JP | 2012195793 A | 10/2012 |

(Continued)

OTHER PUBLICATIONS

EPO translation Yanai JP-2003312415-A (Year: 2021).*

*Primary Examiner* — Kevin P Mahne
(74) *Attorney, Agent, or Firm* — Osha Bergman Watanabe & Burton LLP (57) ABSTRACT

A surrounding vehicle display device includes: a surrounding information detection device that obtains information on surroundings of a host vehicle; a virtual image generation unit that uses the information obtained by the surrounding information detection device to generate a virtual image that indicates the surroundings of the host vehicle as being viewed from above the host vehicle; and a controller that starts examination of whether to perform the auto lane change before performing the auto lane change. The controller starts the examination of whether to perform the auto lane change before performing the auto lane change and then makes a display region of the surroundings of the host vehicle on the virtual image wider than a display region before the examination is started.

8 Claims, 6 Drawing Sheets

(51) Int. Cl.
*B60W 30/18* (2012.01)
*B60W 50/14* (2020.01)
*G06T 3/40* (2006.01)

(52) U.S. Cl.
CPC ........... *B60W 50/14* (2013.01); *G06T 3/4038* (2013.01); *G08G 1/166* (2013.01); *B60R 2300/205* (2013.01); *B60R 2300/607* (2013.01); *B60R 2300/804* (2013.01); *B60W 30/18154* (2013.01); *B60W 30/18159* (2020.02); *B60W 2050/146* (2013.01); *G06T 2207/30256* (2013.01)

(56) References Cited

U.S. PATENT DOCUMENTS

| | | |
|---|---|---|
| 2014/0218509 A1 | 8/2014 | Kondo et al. |
| 2015/0154458 A1 | 6/2015 | Lee et al. |
| 2016/0091896 A1* | 3/2016 | Maruyama ............ B60W 50/10 701/23 |
| 2017/0113686 A1* | 4/2017 | Horita .................... B60W 30/09 |
| 2017/0132480 A1* | 5/2017 | Han .......................... G06T 3/40 |
| 2017/0132481 A1 | 5/2017 | Sato |
| 2017/0151910 A1* | 6/2017 | Sato ......................... B60R 1/00 |
| 2017/0166127 A1 | 6/2017 | Han et al. |
| 2018/0093663 A1* | 4/2018 | Kim ....................... G08G 1/168 |
| 2018/0281681 A1* | 10/2018 | Sunohara ................. H04N 7/18 |
| 2018/0286095 A1* | 10/2018 | Kusayanagi ............. G06T 11/60 |
| 2019/0071098 A1* | 3/2019 | Asakura .................. G08G 1/167 |
| 2020/0026284 A1* | 1/2020 | Hiramatsu ...... B60W 30/18154 |
| 2020/0031278 A1* | 1/2020 | Zafeirakis ................ B60R 1/00 |

FOREIGN PATENT DOCUMENTS

| | | | |
|---|---|---|---|
| JP | 2013117515 A | 6/2013 | |
| JP | 201797709 A | 6/2017 | |
| JP | 2017166913 A | 9/2017 | |

* cited by examiner

SURROUNDING VEHICLE DISPLAY METHOD AND SURROUNDING VEHICLE DISPLAY DEVICE

TECHNICAL FIELD

The present invention relates to a surrounding vehicle display method and a surrounding vehicle display device.

BACKGROUND ART

Conventionally, there is known a method of displaying an image of the surroundings of a host vehicle being looked down from a virtual viewpoint (Patent Literature 1). The invention according to Patent Literature 1 sets a position and a direction of the virtual viewpoint to widen a front region around the host vehicle as a vehicle speed of the host vehicle increases, and generates a display image based on the set position and direction of the virtual viewpoint.

CITATION LIST

Patent Literature

Patent Literature 1: Japanese Patent Application Publication No. 2012-195793

SUMMARY OF INVENTION

Technical Problem

Note that, in a case where lane change control is automatically performed regardless of intension of a driver (auto lane change), it is required to display another vehicle (including a bike and bicycle) and the like around the host vehicle on a display to allow an occupant to grasp the other vehicle and the like around the host vehicle and feel safe. However, the invention according to Patent Literature 1 does not consider about the auto lane change.

The present invention is made in light of the above-mentioned problem, and the object is to provide a surrounding vehicle display method and a surrounding vehicle display device that allow an occupant to grasp another vehicle and the like around a host vehicle for the auto lane change.

Solution to Problem

A surrounding vehicle display method according to an aspect of the present invention obtains information on the surroundings of a host vehicle and uses the obtained information on the surroundings of the host vehicle to generate a virtual image that indicates the surroundings of the host vehicle as being viewed from above the host vehicle. The surrounding vehicle display method starts examination of whether to perform the auto lane change before performing the auto lane change and then makes a display region of the surroundings of the host vehicle on the virtual image wider than a display region before the examination is started.

Advantageous Effects of Invention

According to the present invention, an occupant can grasp another vehicle and the like around a host vehicle for the auto lane change and can feel safe.

DESCRIPTION OF EMBODIMENTS

Hereinafter, embodiments of the present invention are described with reference to the drawings. In the drawings, the same parts are indicated by the same reference signs and descriptions thereof are omitted.

Figure 1:
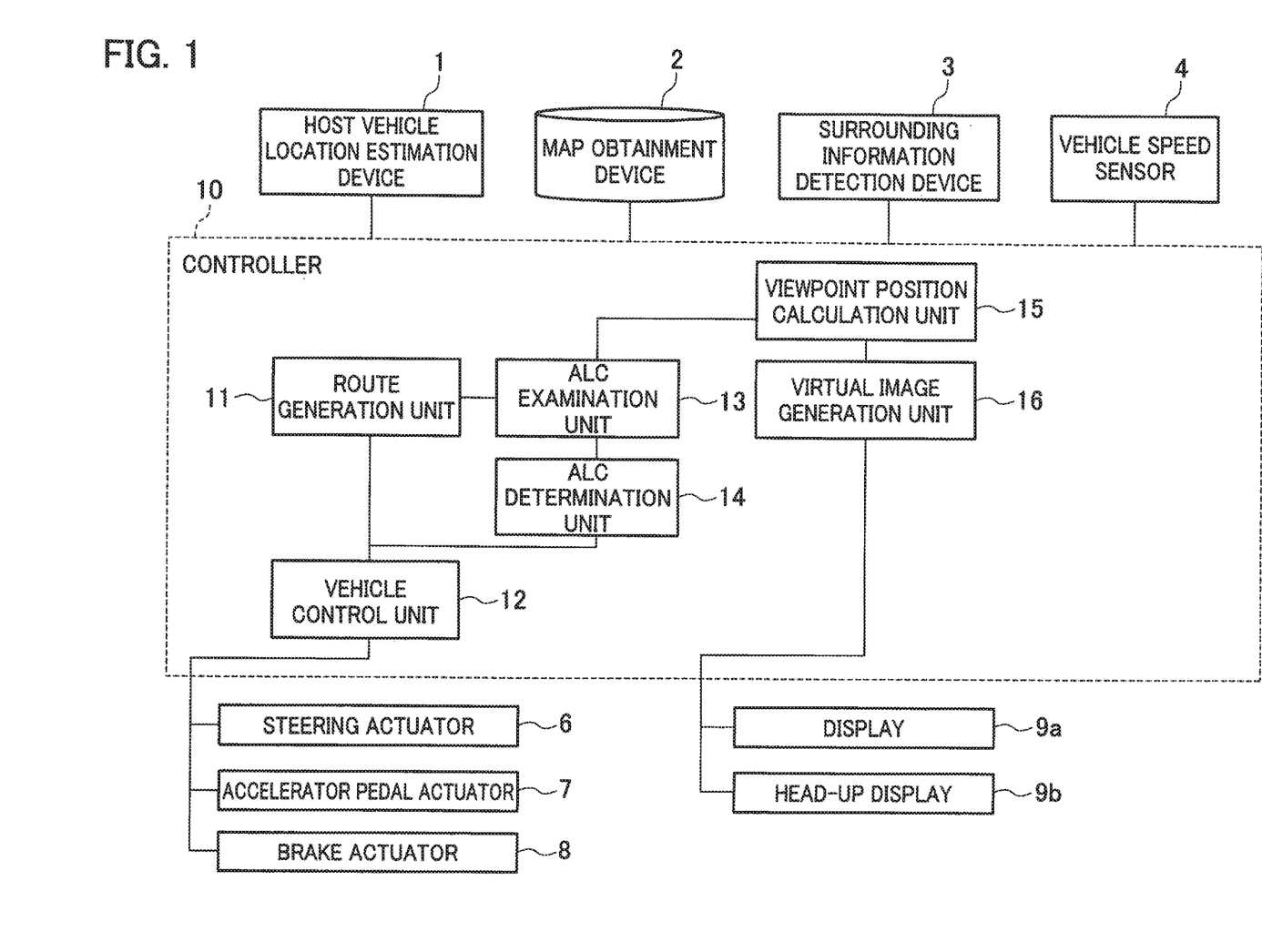
FIG. 1 is a configuration diagram of a surrounding vehicle display device according to an embodiment of the present invention.

(Configuration of Surrounding Vehicle Display Device) A configuration of a surrounding vehicle display device according to this embodiment is described with reference to FIG. 1. The surrounding vehicle display device includes a host vehicle location estimation device 1, a map obtainment device 2, a surrounding information detection device 3, a vehicle speed sensor 4, a controller 10, various actuators 6 to 8, a display 9a, and a head-up display 9b. The surrounding vehicle display device is a device used in an automated driving vehicle with an automated driving function.

The host vehicle location estimation device 1 includes a location detection sensor for measuring an absolute location of the host vehicle such as a GPS (global positioning system) or an odometry mounted in the host vehicle. The host vehicle location estimation device 1 uses the location detection sensor to measure the absolute location of the host vehicle, that is, a location and orientation of the host vehicle with respect to a predetermined reference point. The host vehicle location estimation device 1 outputs the measured location information of the host vehicle to the controller 10.

The map obtainment device 2 obtains map information indicating a configuration of a road where the host vehicle travels. The map information obtained by the map obtainment device 2 includes information on the road configuration such as absolute locations of traffic lanes and connection relationships and relative location relationships between the traffic lanes. The map obtainment device 2 may have a map database storing the map information or may obtain the map information from an external map data server by cloud computing. Additionally, the map obtainment device 2 may obtain the map information through vehicle-to-vehicle communication and road-to-vehicle communication. The map obtainment device 2 outputs the obtained map information to the controller 10.

The surrounding information detection device 3 (information sensor) includes multiple different types of object detection sensors mounted in the host vehicle. The object detection sensors are, for example, a laser range finder, laser radar, millimeter-wave radar, camera, and so on. The surrounding information detection device 3 uses these object detection sensors to detect an object around the host vehicle. The surrounding information detection device 3 detects a moving object including another vehicle, a bike, a bicycle, and a pedestrian and a motionless object including a parking vehicle. For example, the surrounding information detection device 3 detects a location, orientation (yaw angle), size, speed, acceleration, jerk, deceleration, and yaw rate of the moving object and the motionless object with respect to the host vehicle. Additionally, the surrounding information detection device 3 detects a lane marking, traffic light, sign, and the like around the host vehicle. Moreover, the surrounding information detection device 3 may obtain the surrounding information through the vehicle-to-vehicle communication and the road-to-vehicle communication. The surrounding information detection device 3 outputs the detected information to the controller 10.

The vehicle speed sensor 4 detects a vehicle speed of the host vehicle. The vehicle speed sensor 4 outputs the detected vehicle speed of the host vehicle to the controller 10.

The controller 10 obtains the information from the host vehicle location estimation device 1, the map obtainment device 2, the surrounding information detection device 3, and the vehicle speed sensor 4. The controller 10 uses the obtained information to perform travelling control of the host vehicle automatically and generate a virtual image indicating another vehicle, a bike, a bicycle, a pedestrian, and the like around the host vehicle.

The controller 10 is a general-purpose microcomputer including a CPU (central processing unit), memory, and input-output unit. The microcomputer is installed with a computer program for functioning the microcomputer as an automatic traveling control device and a surrounding vehicle display device. The microcomputer executes the computer program to function as multiple information processing circuits included in the automatic traveling control device and the surrounding vehicle display device. Note that, although there is shown an example of implementing the multiple information processing circuits included in the automatic traveling control device and the surrounding vehicle display device by software herein, needless to say, it is also possible to implement the information processing circuits by preparing dedicated hardware for executing the following information processing. Additionally, the multiple information processing circuits may be formed of individual pieces of hardware.

The controller 10 includes a route generation unit 11, a vehicle control unit 12, an ALC examination unit 13, an ALC determination unit 14, a viewpoint position calculation unit 15, and a virtual image generation unit 16 as the multiple information processing circuits.

The route generation unit 11 generates a route to a destination that is set in advance by an occupant of the host vehicle. The route generation unit 11 outputs the generated route to the vehicle control unit 12.

The ALC examination unit 13 examines the possibility that auto lane change may be needed (ALC: auto lane change). In this embodiment, the auto lane change is to perform lane change control regardless of intension of a driver. When starting the examination of the possibility that the auto lane change may be needed, the ALC examination unit 13 outputs a signal indicating starting of the examination to the ALC determination unit 14 and the viewpoint position calculation unit 15. Note that, the signal indicating starting of the examination of the possibility that the auto lane change may be needed is hereinafter simply called a first trigger signal. Additionally, starting the examination of the possibility that the auto lane change may be needed may be simply mentioned as starting the examination of whether to perform the auto lane change.

When obtaining the first trigger signal from the ALC examination unit 13, the ALC determination unit 14 determines whether the auto lane change is needed after a lapse of a predetermined time. When determining that the auto lane change is needed, the ALC determination unit 14 outputs a signal indicating that the auto lane change is needed to the vehicle control unit 12. Note that, the signal indicating that the auto lane change is needed is hereinafter simply called a second trigger signal.

The vehicle control unit 12 controls a steering actuator 6, an accelerator pedal actuator 7, a brake actuator 8, and the like using the information on the surroundings of the host vehicle to allow the host vehicle to automatically travel along the route obtained from the route generation unit 11. Additionally, when obtaining the second trigger signal from the ALC determination unit 14, the vehicle control unit 12 controls the various actuators 6 to 8 and the like and performs the auto lane change.

The viewpoint position calculation unit 15 calculates a position and a direction of a virtual viewpoint. The virtual viewpoint is a viewpoint to look down the host vehicle from behind and above. Although the position of the virtual viewpoint is described as a position set on a central axis with respect to a vehicle-width direction of the host vehicle, the position of the virtual viewpoint is not limited thereto. The direction of the virtual viewpoint is an angle between a direction of a line of vision to look down the host vehicle from the position of the virtual viewpoint and a horizontal plane of the position of the virtual viewpoint. The viewpoint position calculation unit 15 outputs the calculated virtual viewpoint to the virtual image generation unit 16.

The virtual image generation unit 16 uses the information detected by the surrounding information detection device 3 and the like and the virtual viewpoint calculated by the viewpoint position calculation unit 15 to generate a virtual image so as to make an image of looking down from the virtual viewpoint. In other words, the virtual image generation unit 16 generates a virtual image that indicates the surroundings of the host vehicle as being viewed from above the host vehicle. The virtual image generation unit 16 outputs the generated virtual image to the display 9a and the head-up display 9b.

The display 9a is a device that is disposed close to a driver seat on an instrument panel to indicate to the occupant various kinds of information. The display 9a is, for example, formed of a liquid crystal panel and displays images of a speedometer, tachometer, and so on. Additionally, the display 9a displays the virtual image generated by the virtual image generation unit 16.

The head-up display 9b is a device that uses a window glass of the host vehicle (for example, windshield) as a display screen to indicate to the occupant various kinds of information. The head-up display 9b displays information such as the virtual image generated by the virtual image generation unit 16.

(Operation Example of Surrounding Vehicle Display Device)

Next, an operation example of the surrounding vehicle display device is described with reference to FIG. 2.

Figure 2:
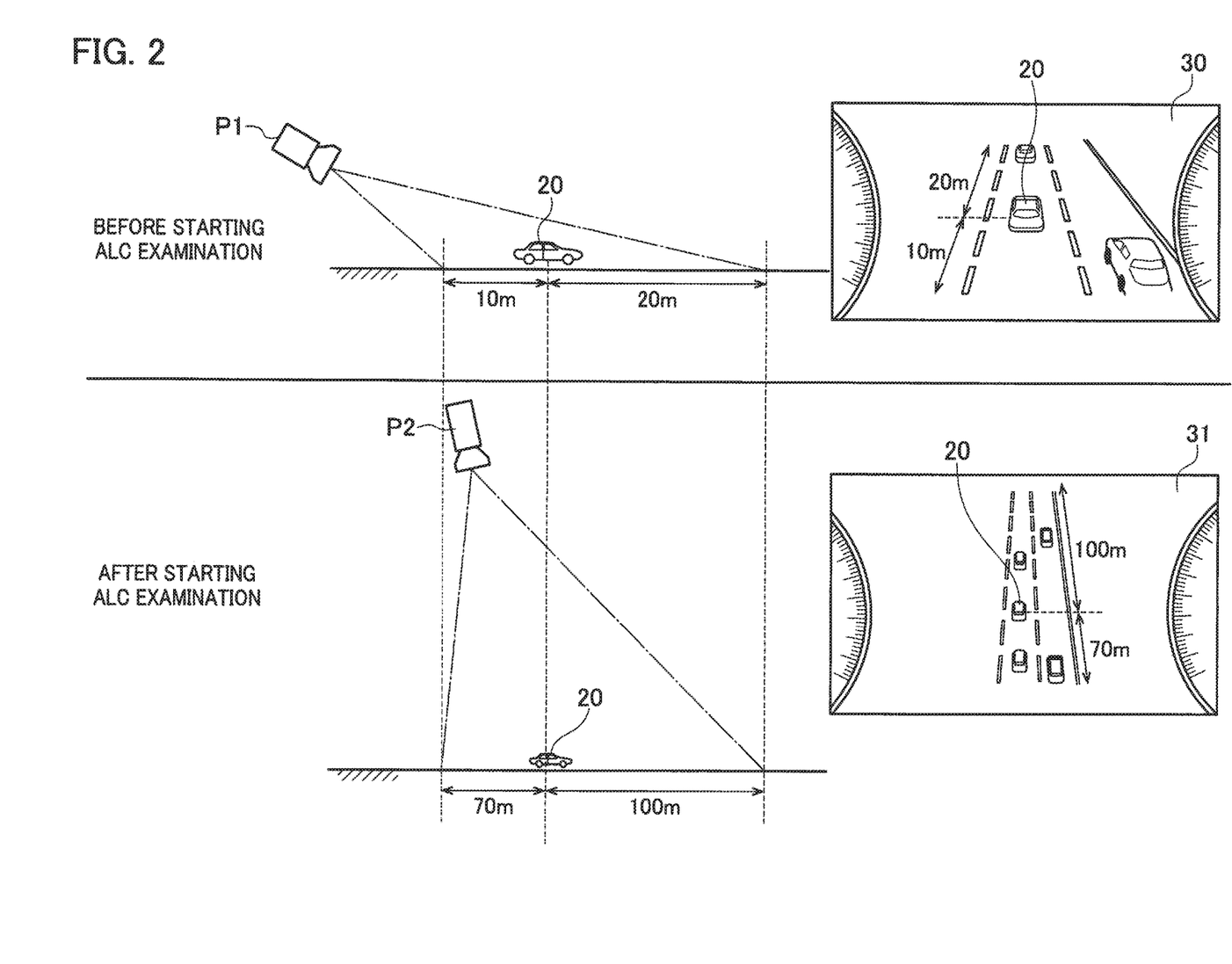
FIG. 2 is a diagram for describing an example of a display region of a virtual image according to the embodiment of the present invention.

As shown in FIG. 2, the position and the direction of the virtual viewpoint calculated by the viewpoint position calculation unit 15 are different between before starting the examination of the auto lane change and after starting the examination. Before the ALC examination unit 13 starts the examination of the auto lane change, the viewpoint position calculation unit 15 calculates a position P1 and the direction of the virtual viewpoint to make the virtual viewpoint relatively close to a host vehicle 20. On the other hand, after the ALC examination unit 13 starts the examination of whether to perform the auto lane change, the viewpoint position calculation unit 15 calculates a position P2 and the direction of the virtual viewpoint to make the virtual viewpoint relatively far from the host vehicle 20.

Before the ALC examination unit 13 starts the examination of whether to perform the auto lane change, the virtual image generation unit 16 generates a virtual image 30 so as to make an image of looking down from the position P1 of the virtual viewpoint. As shown in FIG. 2, a display region of the virtual image 30 includes a region 20 m away from the host vehicle 20 in a traveling direction and a region 10 m away from the host vehicle 20 in an opposite direction of the traveling direction.

Additionally, after the ALC examination unit 13 starts the examination of whether to perform the auto lane change, the virtual image generation unit 16 generates a virtual image 31 so as to make an image of looking down from the position P2 of the virtual viewpoint. As shown in FIG. 2, a display region of the virtual image 31 includes a region 100 m away from the host vehicle 20 in the traveling direction and a region 70 m away from the host vehicle 20 in the opposite direction of the traveling direction.

As shown in the virtual image 30 and the virtual image 31, the display region of the virtual image 31 is wider than the display region of the virtual image 30 in a front region and a rear region of the host vehicle 20. That is, after the ALC examination unit 13 starts the examination of whether to perform the auto lane change, the controller 10 makes the display region of the virtual image wider than a display region before the examination is started. With this widening of the display region of the virtual image, the controller 10 can indicate to the occupant that there is the possibility that the auto lane change may be performed. This allows the occupant to know that there is the possibility that the auto lane change may be performed and also grasp another vehicle, a bike, a bicycle, a pedestrian, and the like in a wide area around the host vehicle 20. Consequently, the occupant can be ready to accept the auto lane change and can feel safe about the auto lane change.

Note that, although the viewpoint position calculation unit 15 calculates both the position and direction of the virtual viewpoint in the operation example shown in FIG. 2, it is not limited thereto. It is sufficient that the viewpoint position calculation unit 15 calculates at least one of the position and the direction of the virtual viewpoint. For example, if the viewpoint position calculation unit 15 sets the position of the virtual viewpoint to a position far from the host vehicle 20, the front region and the rear region around the host vehicle 20 on the virtual image are widened. Additionally, the viewpoint position calculation unit 15 can set the direction of the virtual viewpoint so as to widen the front region and the rear region around the host vehicle 20 on the virtual image. Moreover, the viewpoint position calculation unit 15 may change an angle of view and a focal length of the virtual viewpoint. That is, with the viewpoint position calculation unit 15 changing at least one of the features of the virtual viewpoint including the position, direction, angle of view, and focal length, the surrounding vehicle display device can widen the display region of the virtual image.

Figure 3A:
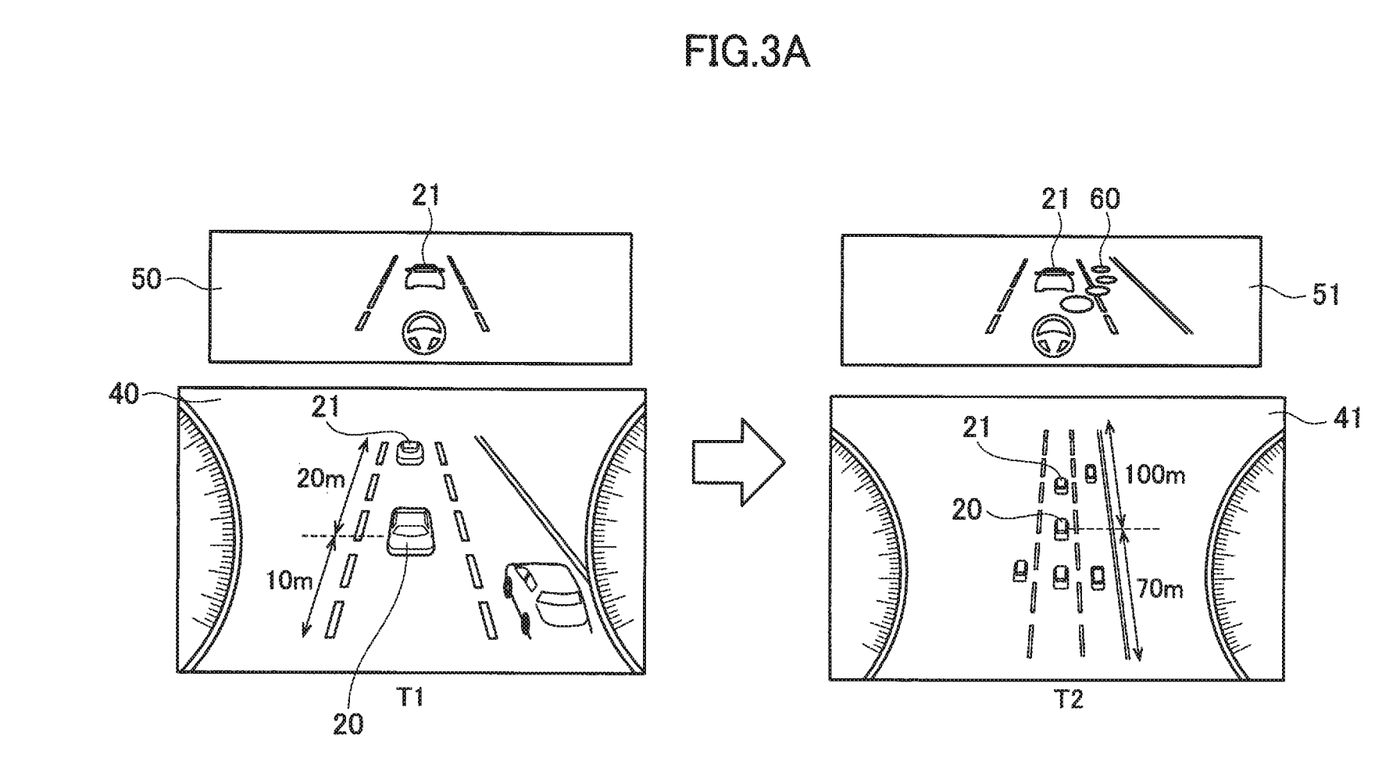
FIG. 3A is a diagram for describing an operation example of the surrounding vehicle display device according to the embodiment of the present invention.
Figure 3B:
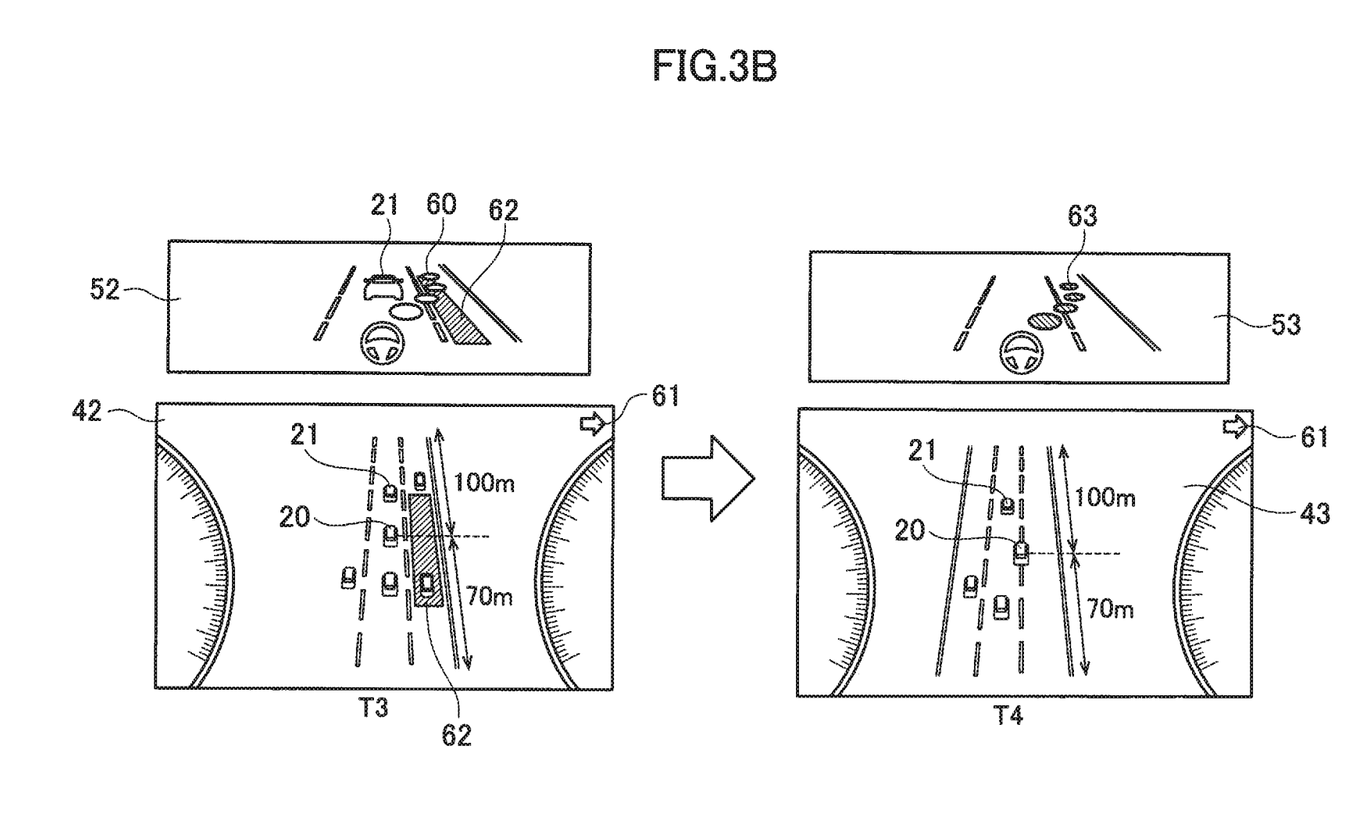
FIG. 3B is a diagram for describing an operation example of the surrounding vehicle display device according to the embodiment of the present invention.
Figure 3C:
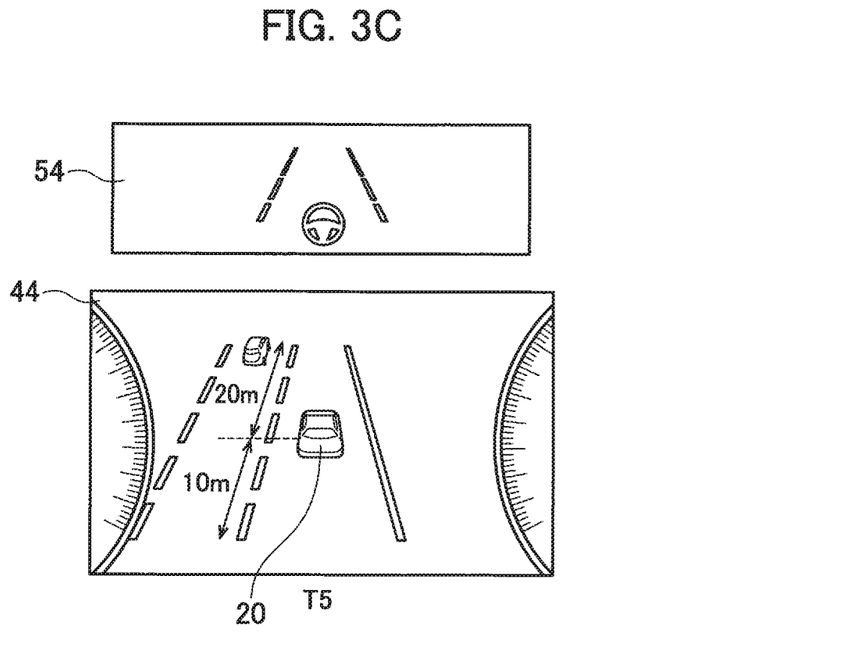
FIG. 3C is a diagram for describing an operation example of the surrounding vehicle display device according to the embodiment of the present invention.

Next, an example of the auto lane change is described with reference to FIGS. 3A to 3C. Virtual images 40 to 44 shown in FIGS. 3A to 3C are displayed on the display 9a. Meanwhile, virtual images 50 to 54 shown in FIGS. 3A to 3C are displayed on the head-up display 9b. The virtual images 40 to 44 correspond to the virtual images 50 to 54, respectively. The positions and the directions of the virtual viewpoints of the virtual images 40 to 44 and the positions and the directions of the virtual viewpoints of the virtual images 50 to 54 may be either the same or different. In the descriptions of the example shown in FIGS. 3A to 3C, the positions and the directions of the virtual viewpoints of the virtual images 40 to 44 and the positions and the directions of the virtual viewpoints of the virtual images 50 to 54 are different. The virtual image generation unit 16 uses previously set positions and directions of the virtual viewpoints to generate the virtual images 50 to 54.

As shown in FIG. 3A, assuming that the surrounding information detection device 3 detects a preceding vehicle 21 that is slower than the host vehicle 20 in front of the host vehicle 20 traveling on a traffic lane at time T1. In such a case where the surrounding information detection device 3 detects the preceding vehicle 21 coming close to the host vehicle 20, the ALC examination unit 13 starts the examination of whether to perform the auto lane change. In other words, when the preceding vehicle 21 indicating a negative value of the speed relative to the host vehicle 20 is detected in front of the host vehicle 20 on the traffic lane where the host vehicle 20 is traveling, the ALC examination unit 13 starts the examination of whether to perform the auto lane change.

In this embodiment, the examination of the possibility that the auto lane change may be needed is performed before the determination of whether the auto lane change is needed. The fact that the ALC examination unit 13 starts the examination of the possibility that the auto lane change may be needed does not mean that the auto lane change is needed immediately. For example, in the traveling scene in FIG. 3A, deceleration of the preceding vehicle 21 may be only temporal and the preceding vehicle 21 may accelerate right after. In this case, the auto lane change is not needed. On the other hand, the preceding vehicle 21 may travel while keeping the slow speed. In this case, the host vehicle 20 eventually needs to adjust the speed to the speed of the preceding vehicle 21 and decelerate to avoid collision with the preceding vehicle 21. Otherwise, the host vehicle 20 needs to perform the auto lane change to overtake the preceding vehicle 21.

Thus, in this embodiment, when the ALC examination unit 13 starts the examination of whether to perform the auto lane change (at time T2 shown in FIG. 3A), the controller 10 widens the display region as shown in the virtual image 41 by changing the position and the direction of the virtual viewpoint. In this way, the controller 10 can indicate to the occupant that there is the possibility that the auto lane change may be performed. This allows the occupant to know that there is the possibility that the auto lane change may be performed and also grasp another vehicle, a bike, a bicycle, a pedestrian, and the like in a wide area around the host vehicle 20.

Additionally, when the ALC examination unit 13 starts the examination of whether to perform the auto lane change, the virtual image generation unit 16 generates an image 60 indicating the possibility that the auto lane change may be performed and overlaps the image 60 on a virtual image 51. In this way, like the expansion of the display region of the virtual image 41, the controller 10 can indicate to the occupant that there is the possibility that the auto lane change may be performed.

Next, as shown in FIG. 3B, in a case where the preceding vehicle 21 travels while keeping the slow speed at time T3 after a lapse of a predetermined time from the time T1, the ALC determination unit 14 determines that the auto lane change is needed and checks another vehicle, a bike, a bicycle, a pedestrian, and the like around the host vehicle 20. An image 62 shown in FIG. 3B indicates a part of the surroundings of the host vehicle 20 that is checked by the ALC determination unit 14. The ALC determination unit 14 checks a region indicated by the image 62, that is, a front region and a rear region around a place on a traffic lane to which the host vehicle moves. Specifically, the ALC determination unit 14 checks whether there is a preceding vehicle or a following vehicle that impedes the auto lane change. With the image 62 displayed, the occupant can grasp that the host vehicle 20 checks the surrounding other vehicle, bike, bicycle, pedestrian, and the like and can feel safe about the automated driving.

Additionally, at the time T3, the virtual image generation unit 16 overlaps an image 61 indicating right-turn on the virtual image 42. The controller 10 indicates to the occupant that the auto lane change starts now by displaying the image 61. At that time, since the display region of the virtual image 42 is already wider than the display region of the virtual image 40 shown in FIG. 3A, the occupant grasps another vehicle, a bike, a bicycle, a pedestrian, and the like in a wide region around the host vehicle 20. This allows the occupant to feel safe about the auto lane change.

Then, time passes, and at time T4 when the ALC determination unit 14 determines that there is no preceding vehicle or following vehicle that impedes the auto lane change, the vehicle control unit 12 performs the auto lane change to overtake the preceding vehicle 21. At that time, the virtual image generation unit 16 generates an image 63 indicating that the auto lane change is being performed and overlaps the image 63 on the virtual image 53. The image 63 allows the occupant to easily know that the auto lane change is being performed. Note that, the shape and the like of the image 63 are not particularly limited as long as the image 63 is different from the image 60. For example, the image 63 may have a different color from the image 60. Otherwise, if the image 60 is a lighted image, the image 63 may be a blinking image.

Time passes, and at time T5 shown in FIG. 3C when the auto lane change is done, the controller 10 changes the position and the direction of the virtual viewpoint to restore the widened display region as shown in the virtual image 44. In other words, the controller 10 narrows the widened display region.

Figure 4:
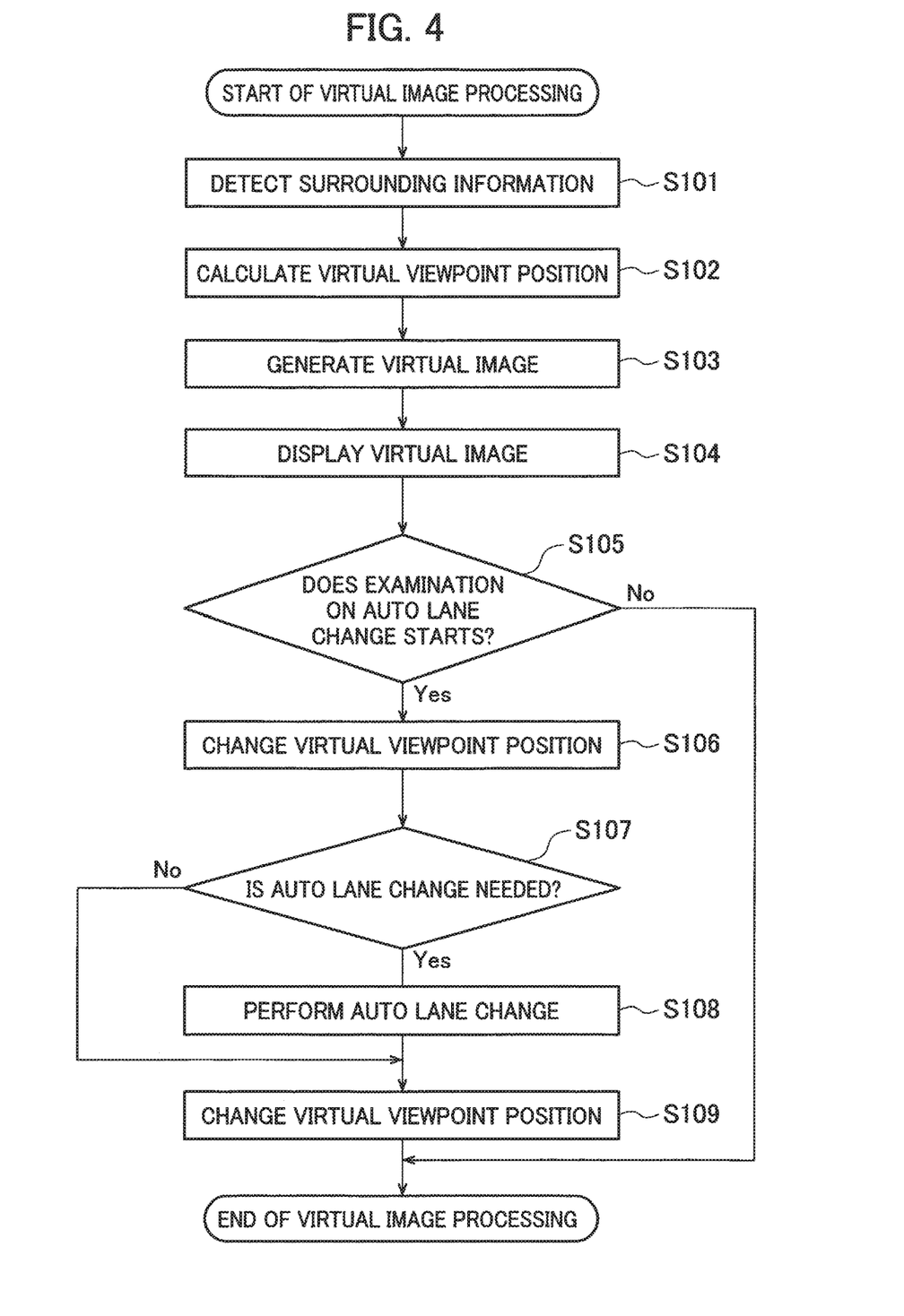
FIG. 4 is a flowchart for describing operation example of the surrounding vehicle display device according to the embodiment of the present invention.

Next, an operation example of the surrounding vehicle display device is described with reference to a flowchart in FIG. 4.

In step S101, the map obtainment device 2 and the surrounding information detection device 3 detect the information on the surroundings of the host vehicle 20. For example, the map obtainment device 2 detects a configuration of the road where the host vehicle 20 travels. The surrounding information detection device 3 detects another vehicle, a lane marking, and the like around the host vehicle 20. Thereafter, the processing proceeds to step S102.

In step S102, the viewpoint position calculation unit 15 calculates the position and the direction of the virtual viewpoint to generate an image of looking down from the virtual viewpoint. The process proceeds to step S103, and the virtual image generation unit 16 uses the information detected in step S101 and the position and the direction of the virtual viewpoint calculated in step S102 to generate the virtual image 30 so as to make an image of looking down from the virtual viewpoint.

The process proceeds to step S104, and the display 9a displays the virtual image 30 generated in step S103. The process proceeds to step S105, and when the ALC examination unit 13 starts the examination of the possibility that the auto lane change is needed, the process proceeds to step S106. Note that, the timing in which the ALC examination unit 13 starts the examination of whether to perform the auto lane change is, for example, when the surrounding information detection device 3 detects the preceding vehicle 21 that is slower than the host vehicle 20 in front of the host vehicle 20 on the traffic lane where the host vehicle 20 is traveling as shown in FIG. 3A. Note that, when the ALC examination unit 13 does not start the examination of whether to perform the auto lane change (No in step S105), the successive processes end.

In step S106, the viewpoint position calculation unit 15 changes the position and the direction of the virtual viewpoint to widen the display region of the virtual image 30 of the front region and the rear region around the host vehicle 20. In this way, the display region of the virtual image 31 generated by the virtual image generation unit 16 is widened, and the controller 10 can indicates to the occupant that there is the possibility that the auto lane change may be performed. This allows the occupant to know that there is the possibility that the auto lane change may be performed and also grasp another vehicle, a bike, a bicycle, a pedestrian, and the like in a wide area around the host vehicle 20. Consequently, the occupant can be ready to accept the auto lane change and can feel safe about the auto lane change. Thereafter, the process proceeds to step S107, and the ALC determination unit 14 determines whether the auto lane change is needed. When the auto lane change is needed (Yes in step S107), the process proceeds to step S108. When the auto lane change is not needed (No in step S107), the process proceeds to step S109.

In step S108, the vehicle control unit 12 performs the auto lane change. Thereafter, the process proceeds to step S109, and the viewpoint position calculation unit 15 changes the position and the direction of the virtual viewpoint to restore the widened display region.

(Operations and Effects)

As described above, according to the surrounding vehicle display device of this embodiment, it is possible to achieve the following operations and effects.

The surrounding information detection device 3 obtains the information on the surroundings of the host vehicle 20. The virtual image generation unit 16 uses the information on the surroundings of the host vehicle 20 obtained by the surrounding information detection device 3 to generate the virtual image indicating the surroundings of the host vehicle 20 being looked down from the above virtual viewpoint. When the ALC examination unit 13 starts the examination of whether to perform the auto lane change before the ALC determination unit 14 determines whether the auto lane change is needed or before the vehicle control unit 12 performs the auto lane change, the controller 10 changes at least either of the position and the direction of the virtual viewpoint and makes the display region around the host vehicle 20 on the virtual image wider than a display region before the ALC examination unit 13 starts the examination. Then, the controller 10 displays the virtual image on the display 9a. With this widening of the display region of the virtual image, the surrounding vehicle display device can indicate to the occupant that there is the possibility that the auto lane change may be performed. This allows the occupant to know that there is the possibility that the auto lane change may be performed and also grasp another vehicle, a bike, a bicycle, a pedestrian, and the like in a wide area around the host vehicle 20. Consequently, the occupant can be ready to accept the auto lane change and can feel safe about the auto lane change.

When the surrounding information detection device 3 detects another vehicle indicating a negative value of the speed relative to the host vehicle 20 in front of the host vehicle 20 on the traffic lane where the host vehicle 20 is traveling, the ALC examination unit 13 starts the examination of whether to perform the auto lane change. At that time, the controller 10 changes at least either of the position and the direction of the virtual viewpoint and makes the display region of the virtual image wider than a display region before the ALC examination unit 13 starts the examination. This allows the occupant to know that there is the possibility that the auto lane change may be performed and also grasp another vehicle, a bike, a bicycle, a pedestrian, and the like in a wide area around the host vehicle 20. Then, after a lapse of a predetermined time, when the other vehicle travels while keeping the low speed, the ALC determination unit 14 determines that the automated driving vehicle needs to perform the auto lane change and indicates that to the occupant. At that time, since the display region already becomes wide, the occupant grasps another vehicle, a bike, a bicycle, a pedestrian, and the like in a wide region around the host vehicle 20. This allows the occupant to feel safe about the auto lane change.

Additionally, the surrounding vehicle display device widens the display region of the surroundings of the host vehicle 20 on the virtual image by changing at least one of the features of the virtual viewpoint including the position, direction, angle of view, and focal length. This allows the occupant to grasp another vehicle, a bike, a bicycle, a pedestrian, and the like in a wide region around the host vehicle 20.

The information on the surroundings of the host vehicle 20 is information on the moving object including at least another vehicle, a bike, a bicycle, and a pedestrian and the motionless object at least including a parking vehicle. Since the information is what the occupant wants to know, the surrounding vehicle display device can meet the need of the occupant by displaying the information on the virtual image.

Other Embodiments

Although the embodiment of the present invention is described above, the descriptions and the drawings as a part of the present disclosure should not be construed to limit the present invention. According to the present disclosure, various alternative embodiments, examples, and operational techniques will be apparent to those skilled in the art.

Although this embodiment describes a case where the vehicle speed of the preceding vehicle 21 is slow as an example of the auto lane change, the traveling scene of the auto lane change is not limited thereto. For example, the surrounding vehicle display device may use a distance from a current location of the host vehicle 20 to a diverging point or an intersection to widen the display region of the virtual image. To describe specifically, the auto lane change may be needed at a diverging point or an intersection when the host vehicle 20 is automatically travelling to the destination. Thus, the surrounding vehicle display device starts the examination of whether to perform the auto lane change when the distance from the current location of the host vehicle 20 to the diverging point or the intersection at which the auto lane change is needed is equal to or shorter than a first predetermined distance, and widens the display region of the virtual image. In this way, the surrounding vehicle display device can indicate to the occupant that there is the possibility that the auto lane change may be performed. This allows the occupant to know that there is the possibility that the auto lane change may be performed and also grasp another vehicle, a bike, a bicycle, a pedestrian, and the like in a wide area around the host vehicle 20. Then, the surrounding vehicle display device performs the auto lane change when the distance from the current location of the host vehicle 20 to the diverging point or the intersection at which the auto lane change is needed is a second predetermined distance that is shorter than the first predetermined distance. At that time, since the display region already becomes wide, the occupant grasps another vehicle, a bike, a bicycle, a pedestrian, and the like in a wide region around the host vehicle 20. This allows the occupant to feel safe about the auto lane change.

Additionally, the surrounding vehicle display device may detect the vehicle speed of the host vehicle 20 and may widen the display region of the virtual image when the detected vehicle speed is higher than a low vehicle speed. In the case of the high vehicle speed, changes of the surrounding other vehicle, bike, bicycle, pedestrian, and the like are greater than the case of the low vehicle speed. Thus, when the vehicle speed is higher than a low vehicle speed, the surrounding vehicle display device widens the display region of the virtual image. This allows the occupant to grasp another vehicle, a bike, a bicycle, a pedestrian, and the like in a wide region around the host vehicle 20 and feel safe about the auto lane change.

In this embodiment, the display region in the traveling direction of the host vehicle 20 and the display region in the opposite direction of the traveling direction are widened as shown in FIG. 2. Additionally, in this embodiment, not only the display region in a front and rear direction of the host vehicle 20 but also the display region in the vehicle-width direction of the host vehicle are widened as shown in FIGS. 3A to 3C. Accordingly, the surrounding vehicle display device may widen only the display region in the front and rear direction of the host vehicle 20 or may widen the display region in the vehicle-width direction of the host vehicle in addition to the display region in the front and rear direction of the host vehicle 20.

In this embodiment, as described with reference to FIG. 2, before the ALC examination unit 13 starts the examination of whether to perform the auto lane change, the display region of the virtual image 30 includes the region 20 m away from the host vehicle 20 in the traveling direction and the region 10 m away from the host vehicle 20 in the opposite direction of the traveling direction. On the other hand, after the ALC examination unit 13 starts the examination of whether to perform the auto lane change, the display region of the virtual image 31 includes the region 100 m away from the host vehicle 20 in the traveling direction and the region 70 m away from the host vehicle 20 in the opposite direction of the traveling direction. Although these distances are not limited, it is preferred to make an increase rate for widening the rear region around the host vehicle 20 greater than an increase rate for widening the front region around the host vehicle 20. For example, using FIG. 2 to give descriptions, the increase rate for widening the rear region around the host vehicle 20 is seven times (from 10 m to 70 m), while the increase rate for widening the front region around the host vehicle 20 is five times (from 20 m to 100 m). Like this, it is preferred to make the increase rate (seven times) for widening the rear region around the host vehicle 20 greater than the increase rate (five times) for widening the front region around the host vehicle 20. This is because it can be thought that the occupant wants to check whether there is a following vehicle coming close from behind on a traffic lane next to the traffic lane where the host vehicle 20 is traveling (a traffic lane to which the host vehicle 20 moves) when the host vehicle 20 performs the auto lane change. Thus, the greater increase rate for widening the rear region around the host vehicle 20 can satisfy the need of the occupant to check another vehicle, a bike, a bicycle, a pedestrian, and the like in the rear region around the host vehicle 20.

Additionally, as shown in FIG. 2, before the ALC examination unit 13 starts the examination of whether to perform the auto lane change, it is preferred to make the rear region around the host vehicle 20 on the virtual image 30 (10 m) smaller than the front region around the host vehicle 20 on the virtual image 30 (20 m). This is because, if the rear region around the host vehicle 20 is wider, the host vehicle 20 and another vehicle behind the host vehicle 20 may be overlapped with each other on the virtual image 30. When the host vehicle 20 and the other vehicle overlap with each other like this case, it is impossible to recognize at a glance that which one of the overlapping vehicles is the host vehicle 20. Otherwise, the host vehicle 20 may be hidden by the other vehicle. For this reason, before the ALC examination unit 13 starts the examination of whether to perform the auto lane change, the surrounding vehicle display device makes the rear region around the host vehicle 20 on the virtual image 30 smaller than the front region around the host vehicle 20 on the virtual image. This allows the surrounding vehicle display device to prevent the overlapping of the host vehicle 20 and the other vehicle on the virtual image 30.

REFERENCE SIGNS LIST 1 host vehicle location estimation device
2 map obtainment device
3 surrounding information detection device
4 vehicle speed sensor
9a display
10 controller
12 vehicle control unit
13 ALC examination unit
14 ALC determination unit
15 viewpoint position calculation unit
16 virtual image generation unit

The invention claimed is:

1. A surrounding vehicle display method comprising:
providing a vehicle with a function of auto lane change;
performing lane change control regardless of intention of a driver;
obtaining, using a plurality of sensors, information on surroundings of the vehicle;
generating from the information, using a controller, a virtual image that indicates the surroundings of the vehicle as being viewed from above the vehicle;
displaying a display region of the virtual image on a display in the vehicle;
commencing, using the controller, an examination of a possibility that an auto lane change is needed based on the obtained information on the surroundings of the vehicle;
in response to commencing the examination, increasing, using the controller, width of the display region from a first width to a second width;
determining, using the controller; whether the auto lane change is needed after increasing the width of the display region and after a lapse of a predetermined time from commencing the examination; and
upon determining that the auto lane change is not needed, restoring the width of the display region from the second width to the first width.

2. The surrounding vehicle display method according to claim 1, wherein,
when another vehicle coming close to the vehicle is detected in front of the vehicle on a traffic lane where the vehicle is traveling, commencing the examination of the possibility that the auto lane change is needed.

3. The surrounding vehicle display method according to claim 1, wherein,
when a distance from a current location of the vehicle to a diverging point or an intersection at which the auto lane change is needed is equal to or shorter than a first predetermined distance, commencing the examination of the possibility that the auto lane change is needed, and
when the distance from the current location of the vehicle to the diverging point or the intersection at which the auto lane change is needed is a second predetermined distance that is shorter than the first predetermined distance, performing the auto lane change.

4. The surrounding vehicle display method according to claim 1, further comprising:
detecting a vehicle speed of the vehicle, and
when the detected vehicle speed is higher than a low vehicle speed, increasing the width of the display region of the surroundings of the vehicle on the virtual image.

5. The surrounding vehicle display method according to claim 1, further comprising:
changing a feature of an above virtual viewpoint to widen the display region of the surroundings of the vehicle on the virtual image.

6. The surrounding vehicle display method according to claim 1, wherein
the information on the surroundings of the vehicle is information on a moving object including at least one of another vehicle, a bike, a bicycle, and a pedestrian and a motionless object including at least a parked vehicle.

7. The surrounding vehicle display method according to claim 1, wherein
when the display region is made wider than the first width, an increase rate for widening a rear region around the vehicle is greater than an increase rate for widening a front region around the vehicle.

8. A surrounding vehicle display device that is configured to be used in a vehicle with a function of auto lane change to perform lane change control regardless of intention of a driver; comprising:
a plurality of sensors that obtain information on surroundings of the vehicle;
a display that displays a virtual image that indicates the surroundings of the vehicle as being viewed from above the vehicle;
a memory that is installed with a computer program which includes instructions and a predetermined rule for the surrounding vehicle display device with the function of auto lane change;
a controller that includes the memory and executes the instructions installed with the memory to:
generate the virtual image from the information;
commence an examination of a possibility that an auto lane change is needed based on the obtained information on the surroundings of the vehicle;
in response to commencing the examination, increasing width of the display region from a first width to a second width;

determine whether the auto lane change is needed after increasing the width of the display region and after a lapse of a predetermined time from commencing the examination; and upon determining that the auto lane change is not needed, restoring the width of the display region from the second width to the first width.

\* \* \* \* \*